United States Patent [19]

Kusumoto

[11] Patent Number: 4,821,069

[45] Date of Patent: Apr. 11, 1989

[54] APPARATUS FOR CONTROLLING THE TEMPERATURE OF A HEAT ROLLER

[75] Inventor: Keizi Kusumoto, Toyokawa, Japan

[73] Assignee: Minolta Camera Kabushiki Kaisha, Osaka, Japan

[21] Appl. No.: 919,456

[22] Filed: Oct. 16, 1986

[30] Foreign Application Priority Data

Oct. 29, 1985 [JP] Japan .................................. 60-242322

[51] Int. Cl.⁴ ............................................. G03G 15/00
[52] U.S. Cl. .................................. 355/14 FU; 219/216
[58] Field of Search ........................ 355/3 FU, 14 FU; 219/216

[56] References Cited

U.S. PATENT DOCUMENTS

| | | | |
|---|---|---|---|
| 4,001,545 | 1/1977 | Wada et al. | 219/216 |
| 4,318,612 | 3/1982 | Brannan et al. | 355/14 FU |
| 4,493,984 | 1/1985 | Yamauchi | 219/216 X |
| 4,556,779 | 12/1985 | Hashimoto et al. | 219/216 |
| 4,603,245 | 7/1986 | Yagasaki | 355/14 FU X |

FOREIGN PATENT DOCUMENTS 3330407 2/1984 Fed. Rep. of Germany .

Primary Examiner—Patrick R. Salce
Assistant Examiner—Marc S. Hoff
Attorney, Agent, or Firm—Burns, Doane, Swecker & Mathis

[57] ABSTRACT

An apparatus for controlling the temperature of a heat roller comprises an infrared thermal sensor unit disposed in close vicinity to the heat roller and including a pyroelectric infrared thermal sensor, a chopper mechanism and a reference thermal sensor, a signal composing device which composes voltage signals produced from the pyroelectric thermal sensor and the reference thermal sensor, a setting signal generating device which produces a signal representing a setting temperature of the heat roller, a comparing device which compares the setting signal provided by the setting signal generating device with the output signal of the composing devices, a control device which controls power supply to a heater of the heat roller in response to the output signal of the comparing device, and setting signal shift device which causes the setting signal from the setting signal generating device to shift during a period after power of the apparatus has been turned on until the output of the reference thermal sensor settles.

8 Claims, 8 Drawing Sheets

APPARATUS FOR CONTROLLING THE TEMPERATURE OF A HEAT ROLLER

BACKGROUND OF THE INVENTION

1. Field of the Invention

The present invention relates to an apparatus for controlling the temperature of a heat roller used in an electrophotographic copying machine or the like for thermally fixing toner on copying paper, and the invention particularly relates to processing of signals for a pyroelectric infrared thermal sensor used for the measurement of the heat roller temperature.

2. Prior Art

In electrophotographic copying machines and the like, a heat roller is used for fixing the image of toner formed on copying paper by exerting heat and pressure on the paper.

In this case, if the temperature of the heat roller surface is too low, a faulty fixing of toner will result, while if the roller surface temperature is too high, a faulty offset of toner or winding of copying paper will result. On this account, the heat roller must have its surface temperature controlled within a certain range.

For this purpose, there has been practiced feedback control of the heat roller temperature in which the roller surface temperature is brought to a predetermined temperature by turning on and off a power supply in accordance with the detected roller surface temperature.

There is known a technique for measuring the heat roller surface temperature using a pyroelectric infrared thermal sensor (will be termed simply "pyroelectric sensor" hereinafter).

The pyroelectric sensor operates to detect in the form of a voltage signal or the like the temperature variation of a heat source object in response to a change in the spontaneous polarization of a pyroelectric member caused by the incident infrared rays from the heat source object under measurement. The sensor voltage output is theoretically given as follows.

$$V = K_1 W, \quad W = K_2 T,$$

Accordingly,
$$V = K_1 K_2 T, \tag{1}$$

Where V denotes the sensor output voltage, W denotes the infrared radiation energy emitted from an object, T denotes the absolute temperature of the object, and $K_1$ and $K_2$ are constants.

The pyroelectric sensor is operative to detect a somewhat sharp temperature variation (a temperature change caused by the incident infrared rays). Accordingly, it provides a zero output against a constant incident of the infrared rays. In a practical use, a chopper mechanism is employed to interrupt the incident infrared rays, thereby creating a sharp temperature variation. As will be appreciated from the above statement, the output of the pyroelectric sensor represents a relative temperature (or temperature difference) between the temperature of a heat source object under measurement and the chopper mechanism periphery temperature, or more preferably the pyroelectric sensor periphery temperature, (will be termed "chopper temperature" hereinafter). The sensor output voltage is theoretically given as follows.

$$V = \alpha(T_1^4 - T_0^4), \tag{2}$$

where $\alpha$ denotes a proportional constant, $T_1$ denotes the temperature of the object under measurement, and $T_0$ denotes the chopper temperature.

Accordingly, in order to know the heat roller surface temperature, the chopper temperature is measured and it is added to the relative temperature detected by the pyroelectric sensor.

FIG. 8 is a graph showing the result of heat roller temperature control, on which are plotted the actual temperature of the heat roller surface (solid line) and the apparent temperature of the heat roller surface (dashed line) obtained by summing the output of the pyroelectric sensor and the reference temperature (chopper temperature) measuring diode sensor (both outputs are also shown separtely). The actual temperature was measured by independent means.

As expressed by the equation (2), the output of the pyroelectric sensor is proportional to the fourth power of the heat roller surface temperature subtracted by the fourth power of the chopper temperature. Namely, the pyroelectric sensor output is not linearly proportional to the difference of temperature of the heat roller surface and in the chopper periphery, and the conflict is particularly significant in the region of larger temperature difference. For example, as shown in FIG. 8, when the chopper temperature is relatively low as is the case immediately after the copying machine has been turned on, the heat roller surface temperature detected as a composite signal derived from the pyroelectric sensor output and diode sensor output is higher than the actual temperature. Therefore, the power switching control for the heater based on the composite signal will result in a heat roller surface temperature lower than the predetermined temperature, and a faulty fixing of toner will result.

SUMMARY OF THE INVENTION

The present invention is intended to cope with the foregoing situation of prior art, and its prime object is to provide a temperature control apparatus for a copying machine heat roller capable of satisfactory toner fixing even in the operating condition of a greater temperature difference between the heat roller and the periphery of the chopper.

An apparatus for controlling the temperature of a heat roller of the present invention comprises an infrared thermal sensor unit disposed in close vicinity to the heat roller and including a pyroelectric infrared thermal sensor, a chopper mechanism and a reference thermal sensor; signal composing means which composes electrical signals produced from the pyroelectric thermal sensor and the reference thermal sensor; setting signal generating means which produces a signal representing setting temperature of the heat roller; comparing means which compares the setting signal provided by the setting signal generating means with the output signal of the signal composing means; control means which controls power supply to a heater of the heat roller in response to the output signal of the comparing means; and setting signal shift means which causes the setting signal from the setting signal generating means to shift during a period after power of the apparatus has been turned on until the output of the reference thermal sensor settles.

This apparatus for controlling the temperature of the heat roller can effectively prevent a fall in the roller surface temperature (particularly a temperature fall at the end of the warming up of the heat roller) which is caused by the output characteristics of the pyroelectric sensor when there is a great difference between the heat roller surface temperature and the chopper periphery temperature.

The stability of heat roller temperature control is not impaired by the variation of the chopper periphery temperature.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
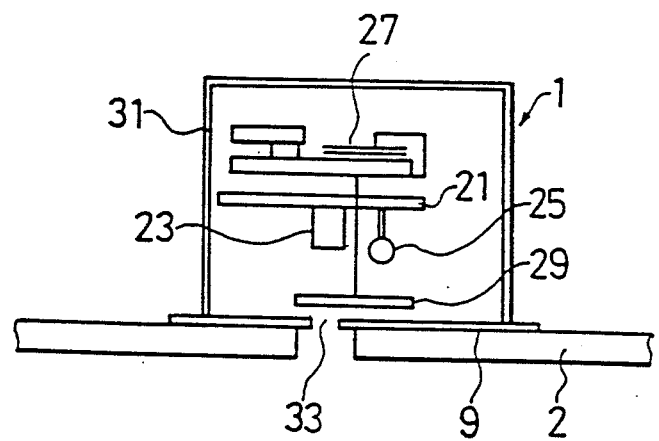
FIG. 1 is a schematic diagram showing the thermal sensor unit incorporating a pyroelectric sensor, a chopper mechanism and a reference thermal sensor.

The features of the preferred embodiment of the present invention are described below The pyroelectric sensor of the conventional type may be used for detecting the temperature difference between the heat roller surface and the periphery of the sensor.

The reference thermal sensor for detecting the temperature in the periphery of the pyroelectric sensor may be of the type of diode sensor or thermoresistor.

The signal composing means for composing voltage signals produced from the two sensors to produce a temperature signal indicating the heat roller surface temperature (actually, the composed signal includes error from the true temperature as mentioned previously) may be arranged on a hardware basis or on a software basis using a microcomputer.

The setting signal generating means produces a signal representing a predetermined setting temperature of the heat roller, and the signal is compared with the output signal of the composing means by the control means so that heating by the heater is controlled in accordance with the comparison result. The heater may be controlled by turning on and off a power supply.

The setting temperature (i.e., the magnitude of the setting signal) can be shifted in response to the previous composed signal and the signal from the reference thermal sensor. The purpose is to correct the above-mentioned error (more strictly, compensation for the controlled temperature lowering caused by the error) which arises at a larger temperature difference between the heat roller surface and the periphery of the pyroelectric sensor.

That is to say, there is a large temperature difference between the heat roller surface and the periphery of the pyroelectric sensor (which results in a higher apparent roller temperature), the setting temperature is raised so as to increase the heat generation by the heater, thereby preventing the controlled temperature from falling below the predetermined temperature.

In shifting the setting temperature, the setting temperature may be lowered progressively as time passes to reflect the time since the magnitude of the signal from the reference thermal sensor has reached a predetermined value, so that finer control is accomplished.

The present invention will be described in a way of a specific embodiment illustrated in the drawings. This embodiment is intended to implement the temperature control for the heat roller of a copying machine.

Figure 2:
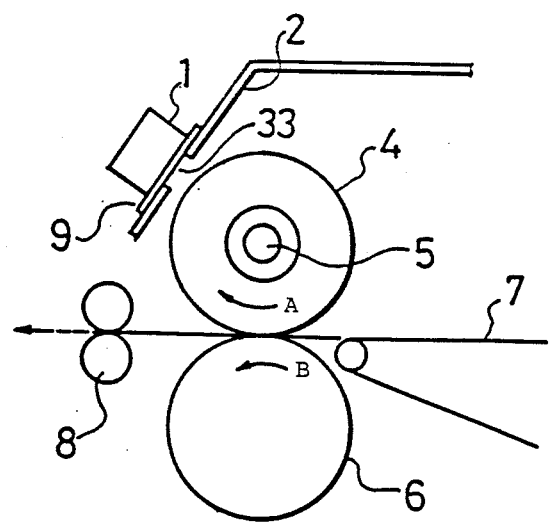
FIG. 2 is a schematic diagram showing the disposition of the thermal sensor unit in the periphery of the heat roller.

FIG. 1 is a schematic diagram of the thermal sensor unit incorporating a pyroelectric sensor and a reference thermal sensor, and FIG. 2 is a schematic diagram showing the thermal sensor unit in the periphery of the heat roller.

As shown in FIG. 1, the sensor unit 1 incorporates a pyroelectric sensor 23 and a reference temperature measuring diode thermal sensor 25 for measuring the reference temperature in the periphery of the chopper, both mounted on a printed wiring board which is fixed to an intermediate plate 21 enclosed within a metallic case 31. In order to vary the amount of infrared rays incident through an opening 33 of the case 31, a chopper disc 29 having a semicircular cut is fixed on the shaft of a stepping motor 27 so that the disc 29 conducts and interrupts the infrared rays alternately through the opening 33 into the pyroelectric sensor 23.

As shown in FIG. 2, the sensor unit 1 is mounted on a heat roller cover 2 through a thermal insulator 9 so that it is adjacent the upper section of an upper heat roller 4 The upper heat roller 4 incorporates a heater lamp (halogen lamp) 5 as a heat source of the heat roller. The upper heat roller 4 is geared so that it rotates in the direction indicated by the arrow A. A lower heat roller 6 is in press-contact with the upper roller 4, and it is rotated by the upper heat roller 4 in the direction indicated by the arrow B. A copying paper with an image of toner formed on it is transported by a conveyor section 7, and it is press-heated by the upper and lower heat rollers 4 and 6 so that toner is fixed on the copying paper. Then, the copying paper is sent out of the copying machine by a discharge roller 8.

Figure 3:
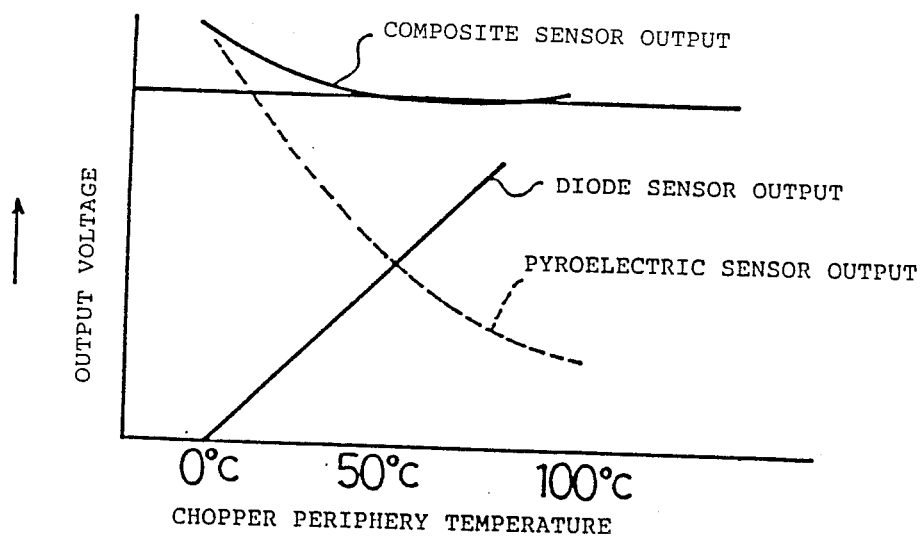
FIG. 3 is a graph showing the output signals of the pyroelectric sensor, diode thermal sensor and their composite signal. All signals are in the form of voltage, and they are plotted against the temperature in the periphery of the chopper.

FIG. 3 shows the output signal of the pyroelectric sensor 23, the output signal of the diode sensor 25 and their composite signal. All signals are in the form of voltage, and they are plotted against the temperature in the periphery of the chopper 29.

As shown in FIG. 3, when the temperature in the periphery of the chopper 29 is relatively low and the temperature difference between the heat roller surface and the periphery of the chopper is large, the temperature of the heat roller surface measured as the composite signal is higher than the actual temperature, as compared with the case of a smaller temperature difference between the heat roller surface and chopper periphery (in the region of chopper periphery temperature around 50~100° C.). This is because the output of the pyroelectric sensor 23 is given as a difference of the fourth power of the heat roller surface temperature and the fourth power of the chopper periphery temperature, as mentioned previously.

Figure 4:
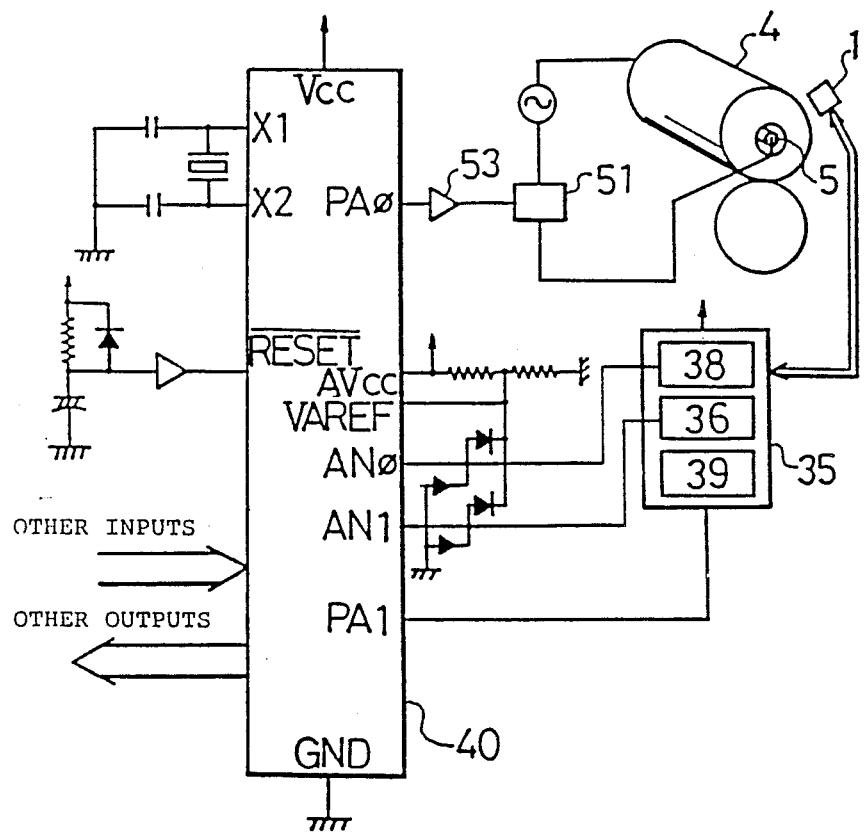
FIG. 4 is a block diagram showing an embodiment of this invention.

FIG. 4 shows the explanatory drawing of this embodiment. The apparatus comprises an infrared sensor unit 1, a circuit 35 for processing the input and output signals of the sensor unit 1, a signal-chip microcomputer 40, an upper heat roller 4 incorporating a heater lamp 5, and a heater lamp drive circuit. The signal processing circuit 35 consists of a circuit 36 for processing the output signal of the pyroelectric sensor 23, a circuit 38 for processing the output signal of the diode thermal sensor 25, and a circuit 39 for driving a stepping motor 27.

The circuit 36 amplifies the voltage signal provided by the pyroelectric sensor 23, holds the peak of the signal, and delivers it to the analog input port AN1 of the microcomputer 40. The circuit 38 amplifies the voltage signal provided by the diode thermal sensor 25, and delivers it to the analog input port AN∅ of the microcomputer 40. The circuits 36 and 38 have their amplifier gains adjusted so that they produce consistent voltage levels for both temperature levels. The circuit 39 drives the stepping motor 27 in response to the drive signal provided by the microcomputer 40 at its output port PA1.

The microcomputer 40 incorporates an A/D converter, and has a linkage with another microcomputer for controlling other sections of the copying machine through bus lines.

The heater lamp drive circuit consists of a solid-state relay 51 for turning on and off the heater lamp and a driver 53 for driving the solid-state relay. The driver 53 operates in response to the signal provided by the microcomputer 40 at its output port PA∅.

Figure 5:
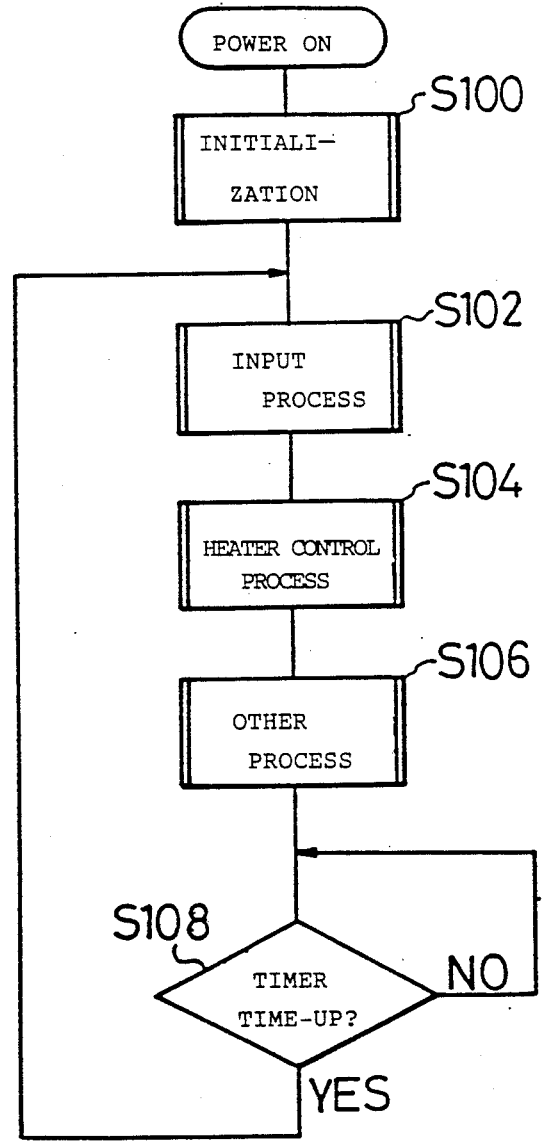
FIG. 5 is a flowchart showing the overall control for controlling a copying machine to which this invention is applied.

FIG. 5 shows in flowchart the overall control of the copying machine implemented by the microcomputer. The microcomputer starts processing when power is turned on, and it first sets up the initial conditions such as flags and RAM contents. Then, the microcomputer enters the loop of operations including the command and data transaction or communication (S102), the heater temperature control according to this invention (S104), and other operations such as numeric display and paper transmission (S106). These cyclic operations are controlled by the internal timer. The temperature control process for the heat roller is included in the control of the copying machine.

Figure 6:
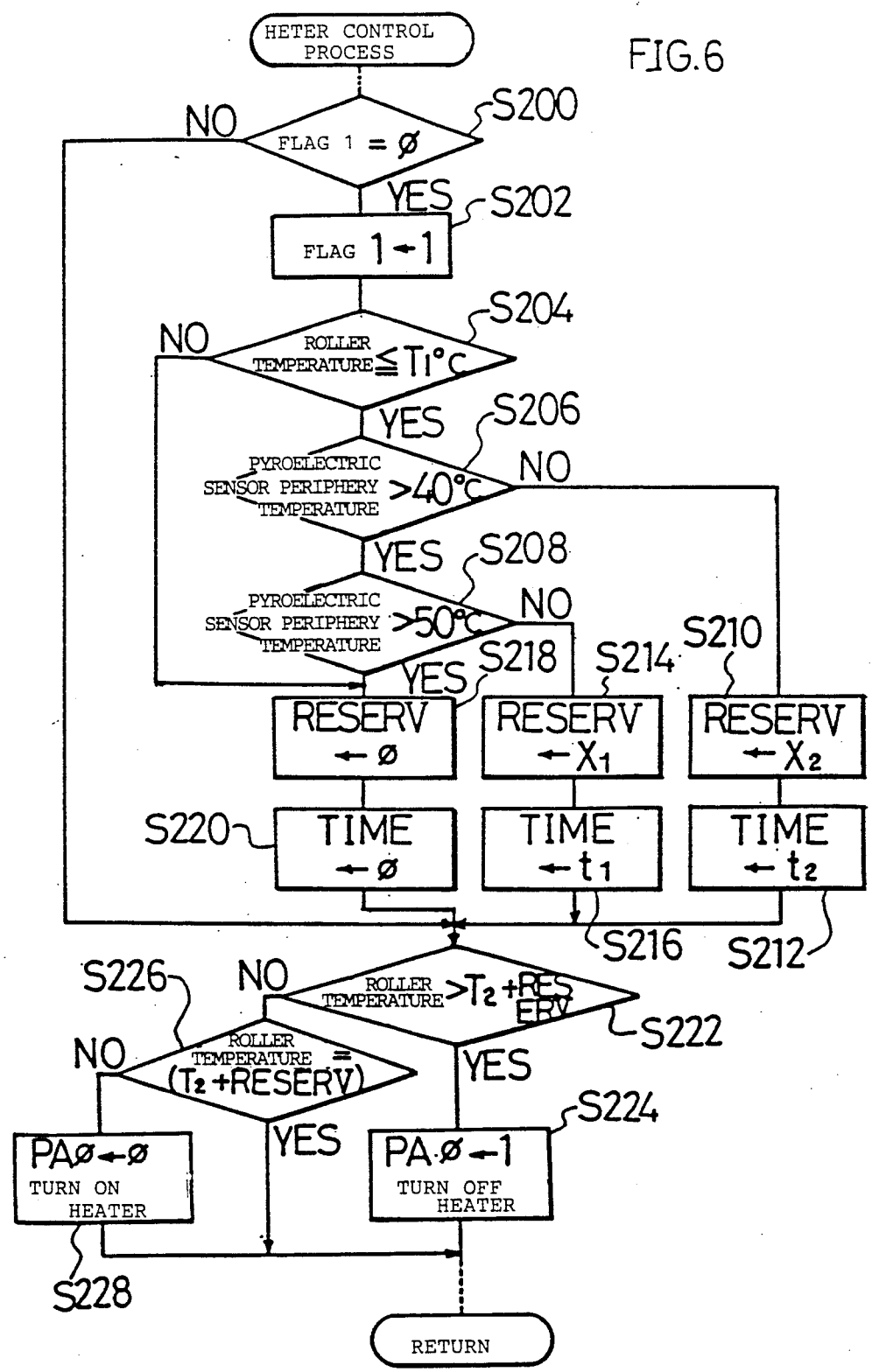
FIG. 6 is a flowchart showing the subroutine of heat roller temperature control.

FIG. 6 shows in flowchart the subroutine of heat roller temperature control (step 104 in FIG. 5) implemented by the microcomputer 40. Upon commencement of the execution of the heat roller temperature control routine, it is first judged whether the heat roller temperature (the composite signal provided by the pyroelectric sensor and the diode sensor outputs) and chopper temperature (the diode sensor output signal) have been checked (S200). In this case, a flag 1 in a set state indicates that the checking has been completed, while the flag 1 in a reset state indicates that the checking is not yet done. With the flag 1 being set, the sequence skips the processes S202-S220 and proceeds to S222. With the flag 1 being reset, steps S202-S208 make a decision for the amount of correction for the heat roller temperature control. First, the flag 1 is set (S202), and it is judged whether the detected heat roller temperature is above $T_1$° C. (S204), more strictly, it is judged whether the composite signal level is higher than the voltage level indicative of $T_1$° C.

If the heat roller temperature detected is above $T_1$° C., indicating that correction of temperature is no longer required, the processes S204-S218 are skipped, and "∅" (zero value) is set to setting temperature correction value address (RESERV) and correction time address (TIME) respectively (S218 and S220). If, on the other hand, the heat roller temperature detected is below $T_1$° C., indicating that temperature correction is necessary, it is judged whether the chopper temperature is above 40° C. (S206), and if it is not more than 40° C., a correction value $X_2$ is set to RESERV and a correction time $t_2$ is set to TIME (S210 and S212).

If the chopper temperature is found above 40° C., further it is judged whether detected temperature in the chopper periphery is above 50° C. (S208), and if it is not more than 50° C., a correction value $X_1$ is set to RESERV and a correction time $t_1$ is set to TIME (S214 and S216). These correction values are in a relationship of $X_2 > X_1$ and $t_2 > t_1$. If, on the other hand, the chopper periphery temperature detected is above 50° C., indicating a little temperature difference between the chopper periphery temperature and the heat roller temperature, no correcting operation takes place (S218 and S220). Namely, the lower the chopper periphery temperature, the greater the temperature difference between the chopper periphery temperature and the roller surface temperature, therefore the larger correction value is applied to the setting temperature level.

Steps S222-S228 are the routine for controlling the heater lamp 5 incorporated in the heat roller 4.

$T_2$° C. is the predetermined temperature of the heat roller surface, and it is higher than $T_1$° C. First, it is judged whether the detected heat roller temperature is in excess of the sum of $T_2$° C. and a temperature indicated by RESERV (S222). If the detected heat roller temperature is found higher than the summed value, the output port PA∅ is made "1" so that the heater lamp is deenergized (S224). If the heat roller temperature is equal to the summed value, the output port PA∅ is left unchanged (S226). If the heat roller temperature is lower than the summed value, the output port PA∅ is made "∅" so that the heater lamp is energized (S228).

In this way, the heater lamp is turned on or off depending on the detected heat roller surface temperature as against the setting temperature, thereby maintaining the roller surface temperature within a range of the predetermined periphery temperature. In measuring the heat roller surface temperature, the error inherent to the characteristics of the pyroelectric sensor is corrected by shifting the comparison level, whereby finer temperature control is accomplished.

In the operation of the copying machine, the chopper periphery temperature rises gradually after the power has been turned on, and the temperature difference between the heat roller and chopper periphery decreases as time passes on. In consequence, the error of the apparent temperature indicated by the composite signal from the actual temperature decreases. On this account, this embodiment includes a following subroutine reflecting the time factor so as to perform finer control.

Figure 7:
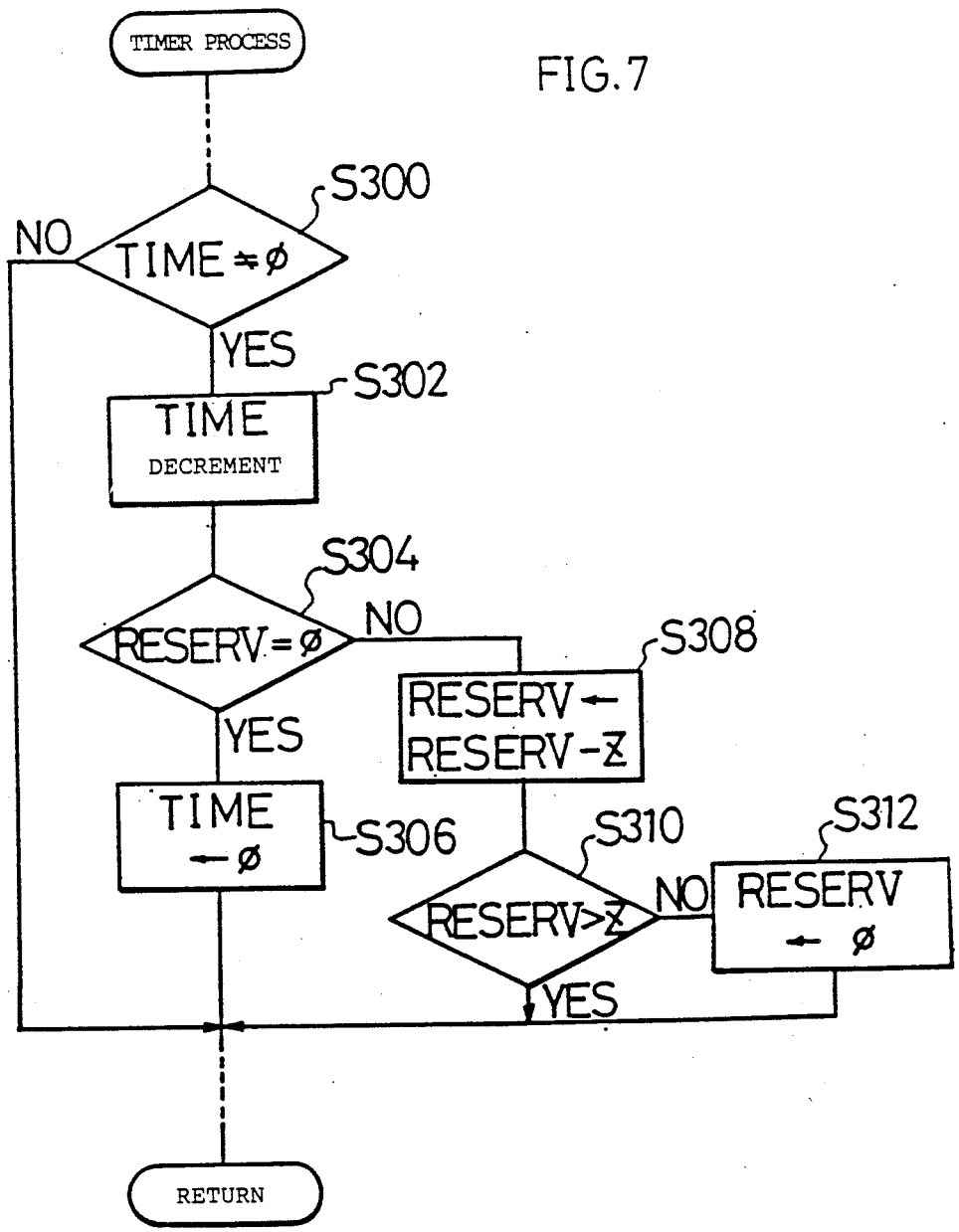
FIG. 7 is a flowchart showing the subroutine of heat roller temperature control in which the correction value for the setting roller temperature is varied progressively.
Figure 8:
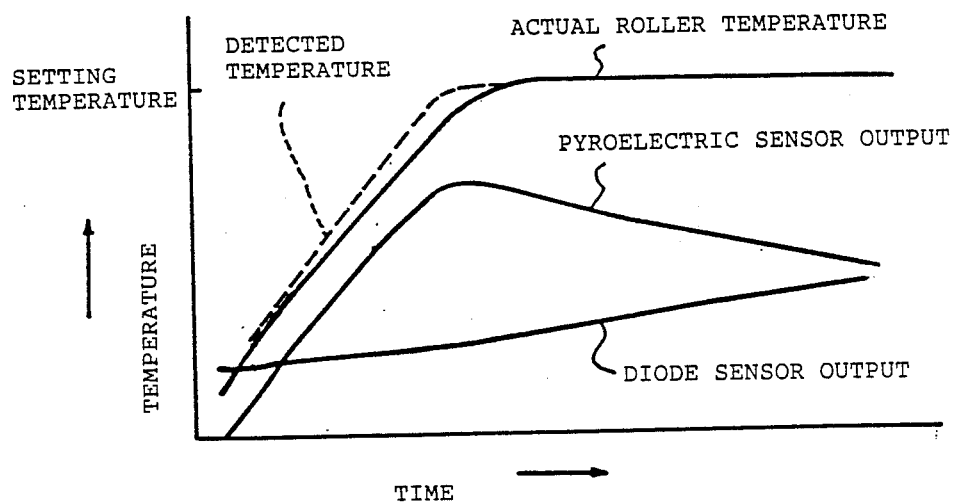
FIG. 8 is a graph showing the actual heat roller surface temperature and the apparent roller temperature derived from the outputs of the pyroelectric sensor and reference diode thermal sensor.

The subroutine is shown in FIG. 7. Initially, it is judged whether the correction time address (TIME) is "∅" (zero correction) (S300), and if it is found zero, the timer is not started and no correction takes place for the heat roller temperature control. If the correction time address (TIME) content is not "∅", it is decremented (S302).

Subsequently, if the setting temperature correction address (RESERV) is "∅", the "∅" is set to TIME (S304 and S306). If the RESERV content is not "∅", it is subtracted by a certain value Z each time the TIME is decremented (S308). These operations are repeated until the RESERV content becomes zero (S310 and S312).

The above timer processing subroutine is run in each cycle of the main routine.

Although in the foregoing embodiment the chopper periphery temperature is compared with 40° C. and 50° C., the present invention is not confined to this scheme, and the chopper periphery temperature may be compared with more than two levels of temperature.

Figure 9:
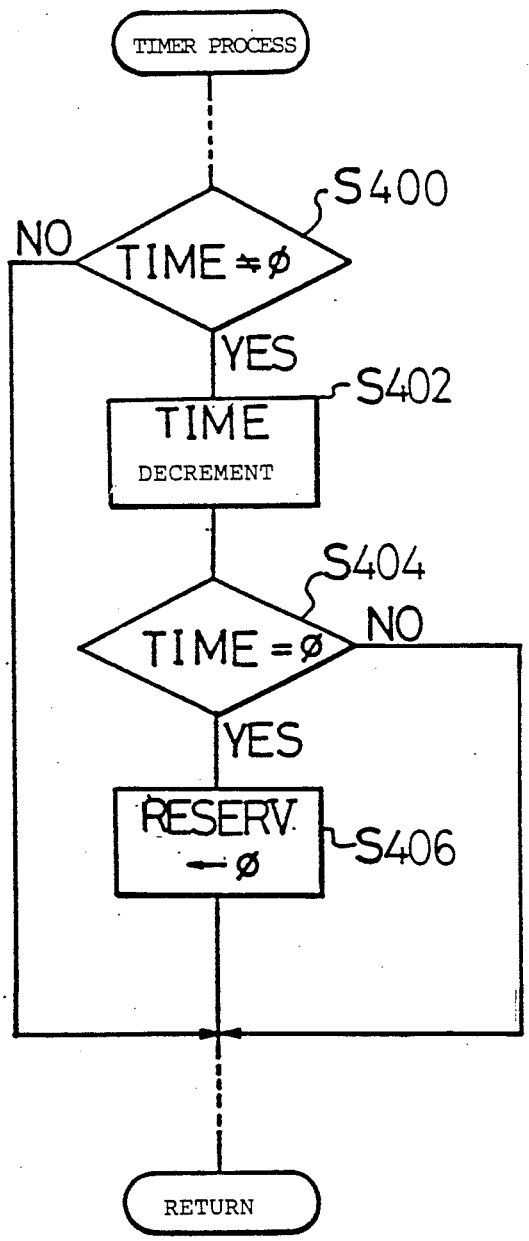
FIG. 9 is a flowchart showing the heat roller temperature control in which the setting temperature corrective operation takes place only in a certain time length.

Although in the foregoing embodiment the amount of correction is decreased progressively as time passes on, the present invention is not confined to this scheme, but instead correction may be implemented for a certain time length ($t_1$ or $t_2$), with the corrective operating being removed thereafter, as shown in the flowchart of FIG. 9.

What is claimed is:

1. An apparatus for controlling the temperature of a heat roller comprising:
   an infrared thermal sensor unit disposed in close vicinity to said heat roller and including a pyroelectric infrared thermal sensor, a chopper mechanism and a reference thermal sensor;
   signal processing means for forming a composite signal from information signals produced by said pyroelectric thermal sensor and said reference thermal sensor;
   setting signal generating means for producing an information signal having a value representative of a setting temperature of said heat roller;
   comparing means for comparing the value of the setting signal produced by said setting signal generating means with the value of said composite signal formed by said signal processing means;
   control means for controlling power supply to a heater of said heat roller in response to the output signal of said comparing means;
   second comparing means for comparing the value of the output of said signal processing means or said reference thermal sensor with the value of a signal representing a temperature lower than the setting temperature of said heat roller; and
   setting signal shift means for shifting the value of the setting signal produced by said setting signal generating means during a period after power of said apparatus has been turned on until the output of said reference thermal sensor stabilizes in response to the output signal of said second comparing means.

2. The apparatus for controlling the temperature of a heat roller according to claim 1,
   wherein the amount of shift created by said setting signal shift means decreases progressively as time passes on.

3. An apparatus for controlling the temperature of a heat roller comprising:
   an infrared thermal sensor unit disposed in close vicinity to said heat roller and including a pyroelectric infrared thermal sensor, a chopper mechanism and a reference thermal sensor;
   signal processing means for forming a composite signal from electrical signals produced by said pyroelectric thermal sensor and said reference thermal sensor;
   setting signal generating means for producing an information signal having a value representative of a setting temperature of said heat roller;
   comparing means for comparing the value of the setting signal produced by said setting signal generating means with the value of said composite signal of said signal processing means;
   control means for controlling power supply to a heater of said heat roller in response to the output signal of said comparing means;
   second comparing means for comparing the value of the output of said signal processing means or said reference thermal sensor with the value of a signal representing a temperature lower than the setting temperature of said heat roller; and
   setting signal shift means for temporarily shifting the value of the setting signal from said setting signal generating means so that the setting temperature rises in response to the output signal of said second comparing means.

4. The apparatus for controlling the temperature of a heat roller according to claim 3,
   wherein the amount of shift created by said setting signal shift means decreases progressively as time passes on.

5. The apparatus for controlling the temperature of a heat roller according to claim 3,
   wherein said shift means causes the setting signal from said setting signal generating means to shift for a certain time length in response to the output from said second comparing means.

6. An apparatus for controlling the temperature of a heat roller comprising:
   an infrared thermal sensor unit disposed in close vicinity to said heat roller and including a pyroelectric infrared thermal sensor, a chopper mechanism and a reference thermal sensor;
   signal processing means for forming a composite signal from electrical signals produced by said pyroelectric thermal sensor and said reference thermal sensor;
   setting signal generating means for producing an information signal having a value representative of a setting temperature of said heat roller;
   comparing means for comparing the value of the setting signal produced by said setting signal generating means with the value of the composite signal formed by said signal processing means;
   control means for controlling power supply to a heater of said heat roller in response to the output signal of said comparing means; and
   setting signal shift means for shifting the value of the setting signal produced by said setting signal generating means during a period after power of said apparatus has been turned on until the output of said reference thermal sensor stabilizes, wherein the amount of shift by said setting signal shifting means decreases progressively as time passes.

7. An apparatus for controlling the temperature of a heat roller comprising:
   an infrared thermal sensor unit disposed in close vicinity to said heat roller and including a pyroelectric infrared thermal sensor, a chopper mechanism and a reference thermal sensor;

signal processing means forming a composite signal from electrical signals produced by said pyroelectric thermal sensor and said reference thermal sensor;

setting signal generating means for producing an information signal having a value representative of a setting temperature of said heat roller;

comparing means for comparing the value of the setting signal produced by said setting signal generating means with the value of said composite signal of said signal processing means;

control means for controlling power supply to a heater of said heat roller in response to the output signal of said comparing means;

second comparing means for comparing the value of the output of said signal processing means or said reference thermal sensor with the value of a signal representing a temperature lower than the setting temperature of said heat roller; and setting signal shift means for temporarily shifting the value of the setting signal from said setting signal generating means so that the setting temperature rises in response to the output signal of said second comparing means, wherein the amount of shift decreases progressively as time passes.

8. An apparatus for controlling the temperature of a heat roller comprising:

an infrared thermal sensor unit disposed in close vicinity to said heat roller and including a pyroelectric infrared thermal sensor, a chopper mechanism and a reference thermal sensor;

signal processing means forming a composite signal from electrical signals produced by said pyroelectric thermal sensor and said reference thermal sensor;

setting signal generating means for producing an information signal having a value representative of a setting temperature of said heat roller;

comparing means for comparing the value of the setting signal produced by said setting signal generating means with the value of said composite signal of said signal processing means;

control means for controlling power supply to a heater of said heat roller in response to the output signal of said comparing means;

second comparing means for comparing the value of the output of said signal processing means or said reference thermal sensor with the value of a signal representing a temperature lower than the setting temperature of said heat roller; and setting signal shift means for temporarily shifting the value of the setting signal from said setting signal generating means so that the setting temperature rises in response to the output signal of said second comparing means, wherein said shift means shifts the setting signal for a certain time length in response to the output from said second comparing means.

* * * * *